(12) United States Patent
Lilleland

(10) Patent No.: US 11,280,684 B2
(45) Date of Patent: Mar. 22, 2022

(54) TEMPERATURE DETECTOR PROBE WITH THERMAL ISOLATION

(71) Applicant: Watlow Electric Manufacturing Company, St. Louis, MO (US)

(72) Inventor: John Lilleland, Morgan Hill, CA (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 314 days.

(21) Appl. No.: 16/360,669

(22) Filed: Mar. 21, 2019

(65) Prior Publication Data

US 2019/0293495 A1  Sep. 26, 2019

Related U.S. Application Data

(60) Provisional application No. 62/647,094, filed on Mar. 23, 2018.

(51) Int. Cl.
| | | |
|---|---|---|
| *G01K 1/00* | (2006.01) | |
| *G01K 7/00* | (2006.01) | |
| *G01K 13/00* | (2021.01) | |
| *G01K 7/02* | (2021.01) | |
| *G01K 1/16* | (2006.01) | |
| *G01K 1/143* | (2021.01) | |
| *G01K 1/08* | (2021.01) | |
| *G01K 1/14* | (2021.01) | |

(52) U.S. Cl.
CPC .............. *G01K 7/02* (2013.01); *G01K 1/08* (2013.01); *G01K 1/14* (2013.01); *G01K 1/143* (2013.01); *G01K 1/16* (2013.01)

(58) Field of Classification Search
USPC ................. 374/208, 163, 183, 179, 147
See application file for complete search history.

(56) References Cited

U.S. PATENT DOCUMENTS

| | | | |
|---|---|---|---|
| 2,588,014 A * | 3/1952 | Knudsen ............... | G01K 1/08 338/28 |
| 3,151,484 A | 10/1964 | Feehan et al. | |
| 4,085,398 A | 4/1978 | Bertram et al. | |
| 4,242,659 A * | 12/1980 | Baxter .................. | G01K 1/16 338/28 |
| 4,454,370 A | 6/1984 | Voznick | |
| 4,492,948 A * | 1/1985 | Clayton ................. | G01K 1/18 338/22 R |

(Continued)

FOREIGN PATENT DOCUMENTS

DE  202013007490  11/2013

OTHER PUBLICATIONS

International Search Report for International Application PCT/US2019/023364, dated Feb. 7, 2019.

*Primary Examiner* — Mirellys Jagan
(74) *Attorney, Agent, or Firm* — Burris Law, PLLC

(57) ABSTRACT

The present disclosure is directed toward a temperature detector probe that includes a housing, a pair of electrical connectors, a support cap, and a sensor. The housing defines a bore longitudinally extending through the housing, and the pair of electrical connectors extend through the bore. The support cap is disposed at a first end portion of the housing. The sensor is provided on the support cap and is electrically coupled to the pair of electrical connectors. The support cap is positioned between the pair of electrical connectors and the support cap.

20 Claims, 4 Drawing Sheets

(56) References Cited

U.S. PATENT DOCUMENTS

| | | | |
|---|---|---|---|
| 4,749,415 A | 6/1988 | Barton | |
| 5,696,348 A * | 12/1997 | Kawamura | G01K 1/125 |
| | | | 136/201 |
| 6,257,758 B1 | 7/2001 | Culbertson | |
| 7,000,478 B1 * | 2/2006 | Zwollo | G01K 1/08 |
| | | | 374/E1.011 |
| 7,473,031 B2 | 1/2009 | Wolkin et al. | |
| 7,651,269 B2 | 1/2010 | Comendant | |
| 7,909,509 B2 | 3/2011 | Mau | |
| 8,118,486 B2 * | 2/2012 | Nyffenegger | G01K 7/16 |
| | | | 374/185 |
| 8,162,539 B2 | 4/2012 | Mau et al. | |
| 9,417,138 B2 | 8/2016 | Krampert et al. | |
| 2003/0142721 A1 * | 7/2003 | Hammer | G01K 17/20 |
| | | | 374/29 |
| 2004/0076215 A1 * | 4/2004 | Baumbach | G01K 7/42 |
| | | | 374/29 |
| 2007/0217480 A1 * | 9/2007 | Lai | G01K 13/08 |
| | | | 374/208 |
| 2007/0234818 A1 * | 10/2007 | Weppenaar | G01K 7/02 |
| | | | 73/761 |
| 2008/0043803 A1 * | 2/2008 | Bandoh | G05D 23/22 |
| | | | 374/100 |
| 2009/0022205 A1 * | 1/2009 | Comendant | G01K 1/143 |
| | | | 374/161 |

* cited by examiner

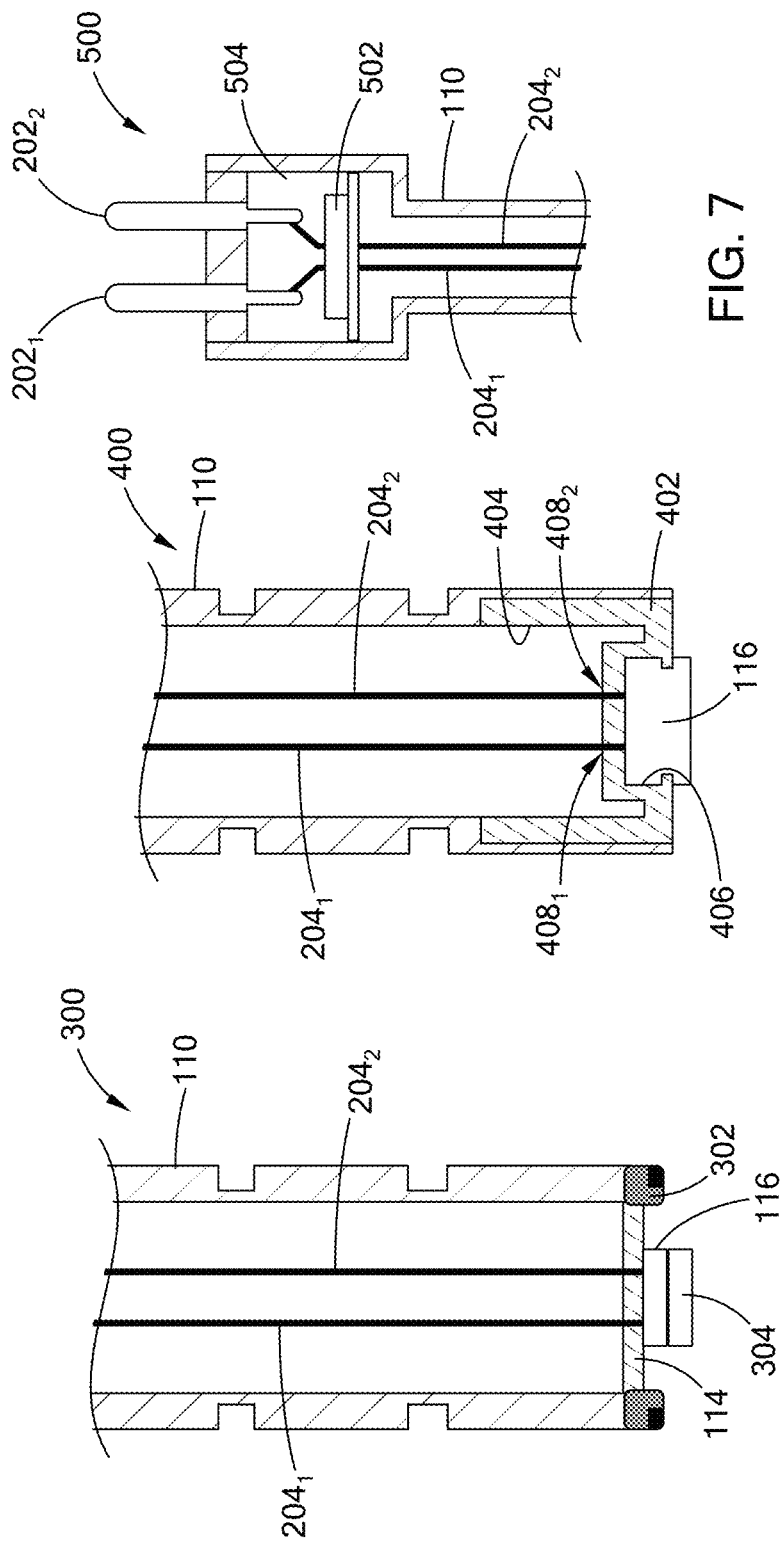

TEMPERATURE DETECTOR PROBE WITH THERMAL ISOLATION

CROSS-REFERENCE TO RELATED APPLICATIONS

The present application claims the benefit of and priority to U.S. Provisional Application No. 62/647,094 filed on Mar. 23, 2018. The content of the above application is incorporated herein by reference in its entirety.

FIELD

The present invention relates to a surface temperature sensor device that detects a temperature of a surface.

BACKGROUND

The statements in this section merely provide background information related to the present disclosure and may not constitute prior art.

Surface temperature detectors are designed to be close to or even contact a surface to measure the temperature of the surface. Such temperature detectors are used to provide temperature measurements in temperature sensitive processes. For example, semiconductor processes depend on accurate temperature measurements to control the temperature of various components within a processing chambers, such as chuck/pedestal used for forming semiconductor wafers.

Typically, a surface temperature detector includes a thermal sensing device, such as a resistive temperature device, that is positioned in a housing. The accuracy of the thermal sensing device varies based on, for example, the thermal conductivity between the housing and the sensing device, the position of the thermal sensing device relative to the surface being measured, the material properties of the thermal sensing device, and other factors. These and other issues are addressed the teachings of the present disclosure.

SUMMARY

This section provides a general summary of the disclosure and is not a comprehensive disclosure of its full scope or all of its features.

The present disclosure is directed toward a temperature detector probe that includes a housing, a pair of electrical connectors, a support cap, and a sensor. The housing defines a bore extending longitudinally through the housing. The pair of electrical connectors extend longitudinally through the bore. The support cap is disposed at a first end portion of the housing, and the sensor is provided on the support cap and electrically coupled to the pair of electrical connectors. The support cap is positioned between the pair of electrical connectors and the sensor.

In one form, the temperature detector probe further includes a pair of electrical pins extending through a second end portion of the housing and electrically coupled to the pair of electrical connectors.

In another form, the pair of electrical connectors are POGO pins that are electrically coupled to the sensor via the support cap.

In yet another form, the pair of electrical connectors are a pair of wires that are electrically coupled to the sensor via the support cap.

In one form, the support cap is made of polyamide.

In another form, the support cap includes two plated through-holes to electrically couple the pair of electrical connectors and the sensor.

In yet another form, the sensor is a resistance temperature detector sensor chip.

In one form, the sensor is a thin film resistive element deposited on the support cap, and the thin film resistive element has a high temperature coefficient of resistance. In one variation, the thin film resistive element is one of copper, nickel, nickel-iron, or platinum.

In another form, the temperature detector probe further includes a temperature insulating material disposed on a surface of the sensor.

In yet another form, the sensor is configured to directly contact a surface of an object to measure a temperature of the object.

In one form, the housing defines one or more circumferential grooves along an exterior of the housing.

In another form, the sensor is a thermocouple.

In one form, the temperature detector probe further includes a signal processing circuit that is communicably coupled to the sensor to condition a signal from the sensor. In one variation, the housing defines a chamber at a second end portion of the housing, and the signal processing circuit is disposed at the chamber. The pair of electrical connectors are electrically coupled to the signal processing circuit to communicably couple the sensor and the signal processing circuit.

In another form, the present disclosure is directed toward a system comprising an object, and the temperature detector probe of the present disclosure. The temperature detector probe is disposed in the object, and the sensor of the temperature detector probe directly faces the surface of the object.

In one form, the present disclosure is directed toward a temperature detector probe that includes a housing, a pair of electrical connectors, a support cap, and a sensor. The housing defines a bore extending longitudinally through the housing. The housing has one or more circumferential grooves along an exterior of the housing. The pair of electrical connectors extend longitudinally through the bore. The support cap is disposed at a first end portion of the housing. The support cap includes a first surface facing the bore and a second surface exposed to environment. The sensor generates a signal indicative of a temperature. The sensor is electrically coupled to the pair of electrical connectors, and is disposed on the second surface of the support cap away from the bore.

In yet another form, the temperature detector probe further includes a pair of electrical pins extending through a second end portion of the housing. The pair of electrical connectors are a pair of wires that are electrically coupled to the pair of electrical pins and to the sensor via the support cap.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a partial cross-sectional of a temperature detector probe in a third form in accordance with the teachings of the present disclosure;

FIG. 6 is a partial cross-sectional of a temperature detector probe in a fourth form in accordance with the teachings of the present disclosure; and FIG. 7 is a partial cross-sectional of a temperature detector probe in a fifth form in accordance with the teachings of the present disclosure.

Figure 1:
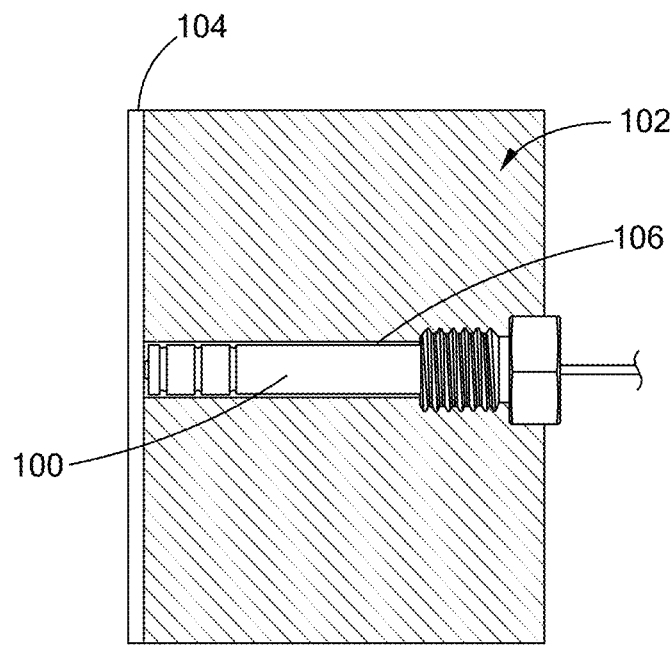
FIG. 1 is a partial cross-sectional view of an object with a temperature detector probe in a first form in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed toward a temperature detector probe that reduces or inhibits thermal conductivity between the probe and an object, and also reduces thermal shunting of the temperature measurement. More particularly, as described herein, the temperature detector probe includes a housing that has grooves circumferentially extending along its exterior at a portion of the probe closest to the surface being measured. The grooves may form a thermal breaker to reduce the transfer of heat between the object and the probe. In addition, the probe includes a sensor that is disposed outside of the housing and is positioned in proximity of or in some forms, directly contacting the surface being measured. This arrangement may improve the response time of the sensor while minimizing thermal shunting. It should be readily understood that the temperature detector probe of the present disclosure addresses other issues, and should not be limited to the examples provided herein.

Referring to FIG. 1 a temperature detector probe 100, which may also be referred to as a sensor device, is operable to detect the temperature of an object 102, and more particularly, a surface 104 of the object 102. The object 102 may be, for example, a chuck or pedestal used for processing semiconductor wafers. However, the temperature detector probe 100 may be used to detect the temperature of other objects and should not be limited to the examples provided herein.

In one form, the temperature detector probe 100 extends through the object 102 up to the surface 104. In one form, a gap 106 is provided between the temperature detector probe 100 and the object 102 to reduce thermal conductivity between the object 102 and the probe 100. The size of the gap can vary based on the application.

Figure 2:
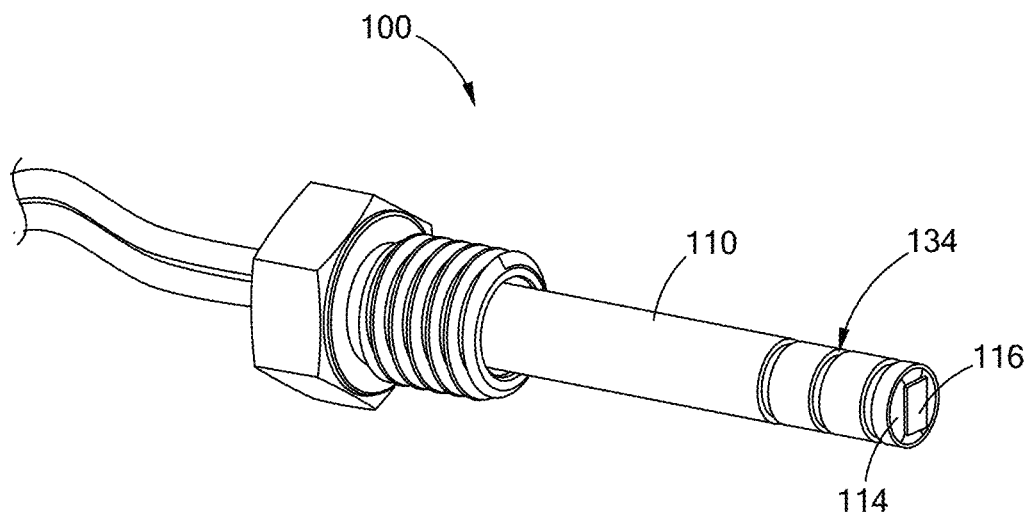
FIG. 2 is a perspective view of the temperature detector probe of FIG. 1.
Figure 3:
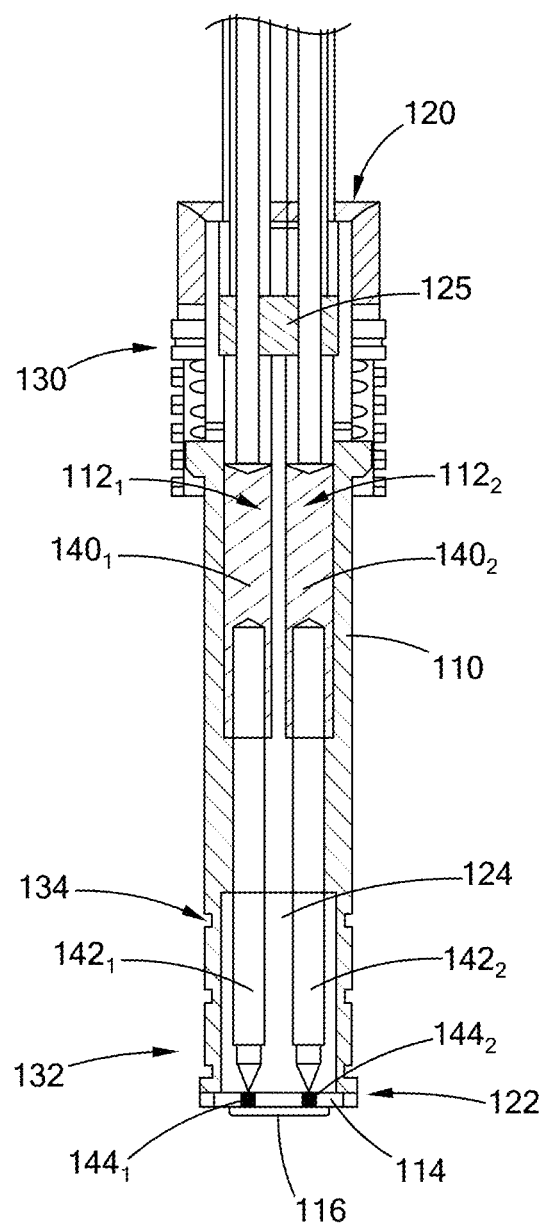
FIG. 3 is a cross-sectional view of the temperature detector probe of FIG. 2.

Referring to FIGS. 2 and 3, in one form, the probe 100 includes a housing 110, one or more electrical connectors 112 (i.e., $112_1$ and $112_2$), a support cap 114, and a sensor 116. The housing 110 has a first end portion 120 and a second end portion 122, and defines a bore 124 that extends longitudinally through the housing 110 between the first end portion 120 and the second end portion 122. In one form, a cap 125 is provided at the first end portion 120 to prevent foreign matter from entering the probe 100. The housing 110 may be viewed as having an extension portion 130, which includes the first end portion 120, and a sensor portion 132, which includes the second end portion 122. When located within the object 102, the sensor portion 132 is positioned closer to the surface 104 of the object 102 than the extension portion 130. In one form, the sensor portion 132 of the housing 110 includes one or more thermal breaks 134 provided as circumferential grooves defined along an exterior of the housing 110 to inhibit thermal conductivity between the object 102 and the probe 100, and between the extension portion 130 and the sensor portion 132. In one form, the thermal breaks 134 extend through the housing 110, and in another form, a thin wall of the housing 110 is provided between the thermal breaks 134 and the bore 124. The housing 110 may be made of plastic, such high-performance polyimide-based plastics, such as polyether ether ketone, or other suitable material.

The electrical connectors 112 extend through the bore 124 to the second end portion 122 of the sensor portion 132. The electrical connectors 112 are configured to electrically couple and thus, communicatively couple the sensor 116 to a control system (not shown) that receives signals indicative of the surface temperature of the object. In one example application, the control system is configured to control a heater, such as a pedestal heater. The control system receives the signals from the probe 100, and controls power to the heater system based on the signal and other inputs. This is just one example application, The electrical connectors 112 extend longitudinally through the bore 124 and are electrically coupled to the sensor 116. In one form, the electrical connectors 112 are a pair of pins, such as a pair of POGO pins, and each pin includes a lead portion 140 (i.e., $140_1$ and $140_2$) and a pin portion 142 (i.e., $142_1$ and $142_2$). The lead portion 140 extends through the first end portion 120 and is configured to electrically couple to a control system via a cable/wire connection. The pin portion 142 extends from the lead portion 140 to the second end portion 122 and is electrically coupled to the sensor 116. The electrical connectors may be configured in other suitable ways, an example of which is provided below.

The support cap 114 is located at the second end portion 122, and is configured to align and support the sensor 116 with the surface 104 of the object 102. In one form, the support cap 114 has a disk like shape and is made of a low thermal conductive material, such as polyamide, to inhibit thermal conductivity between the sensor 116 and the housing 110. Other materials may include elastomeric materials such as polydimethylsiloxanes. The support cap 114 includes a first surface that faces the bore 124 and a second surface that is exposed to the environment. The support cap 114 is configured in various suitable ways based on the size of the sensor 116 and packaging size of the probe 100. For example, in one form, the thickness of the support cap 114 is approximately 0.001 to 0.005 inch. The support cap 114 is also configured to electrically couple the sensor 116 to the electrical connectors 112. In one form, with the sensor 116 being a surface mount device, the support cap 114 includes plated through holes 144 (i.e., $144_1$ and $144_2$) that electrically couple to solder pads of the sensor 116 and to the electrical connectors 112. Other suitable methods for electrically coupling the sensor 116 to the electrically connectors 112 via the support cap 114 may also be used while remaining within the scope of the present disclosure.

The sensor 116 is operable to measure a temperature of the surface 104, and outputs a signal indicative of the temperature to the control system. In one form, the sensor 116 is a resistance temperature detector (RTD) type sensor that is located on the support cap 114, and more particularly, along a second surface of the support cap 114. In FIG. 3, the sensor 116 is provided as a RTD surface mount device that generally includes a case and a resistive element having a high temperature coefficient of resistance (TCR) disposed within the case. For example, the resistive element may be, but is not limited to, copper, nickel, nickel-iron, or platinum. The RTD surface mount device is mounted to the support cap 114 via reflow solder. In one example implementation, the RTD surface mount device follows an industry standard 0603 size (0.8×1.6 mm) for surface mount devices, and has a 0.45 mm thickness and has a mass of 1.9 mg. In another form, the sensor 116 is a thermocouple mounted to the surface of the support cap 114.

Based on the application, the sensor 116 is configured to directly contact or be in proximity to the surface 104 of the object 102 to measure a temperature of the surface 104. In one form, the support cap 114 has resilient or elastic qualities, such that the position of sensor 116 is flexible to contact the surface 104 of the object 102. In addition, with the electrical connectors 112 being POGO pins, the pins provide a biasing force against the support cap 114 and the sensor 116 to have the sensor 116 contact the surface 104.

In operation, the probe 100 is positioned in the object 102, and is electrically coupled to the control system by way of the electrical connectors 112 and wires. The sensor 116 may be in direct contact with or is proximity to the surface 104 to measure the temperature of the surface 104. The control system is communicably coupled to the sensor 116, and receives a signal that is indicative of temperature from the sensor 116.

By way of the support cap 114 and the housing 110 having the grooves, the thermal conductivity between probe 100 and the object and between the sensor 116 and the housing 110 is reduced or inhibited to potentially improve, for example, accuracy, response time, and offset errors of the sensor.

Figures 4A, 4B:
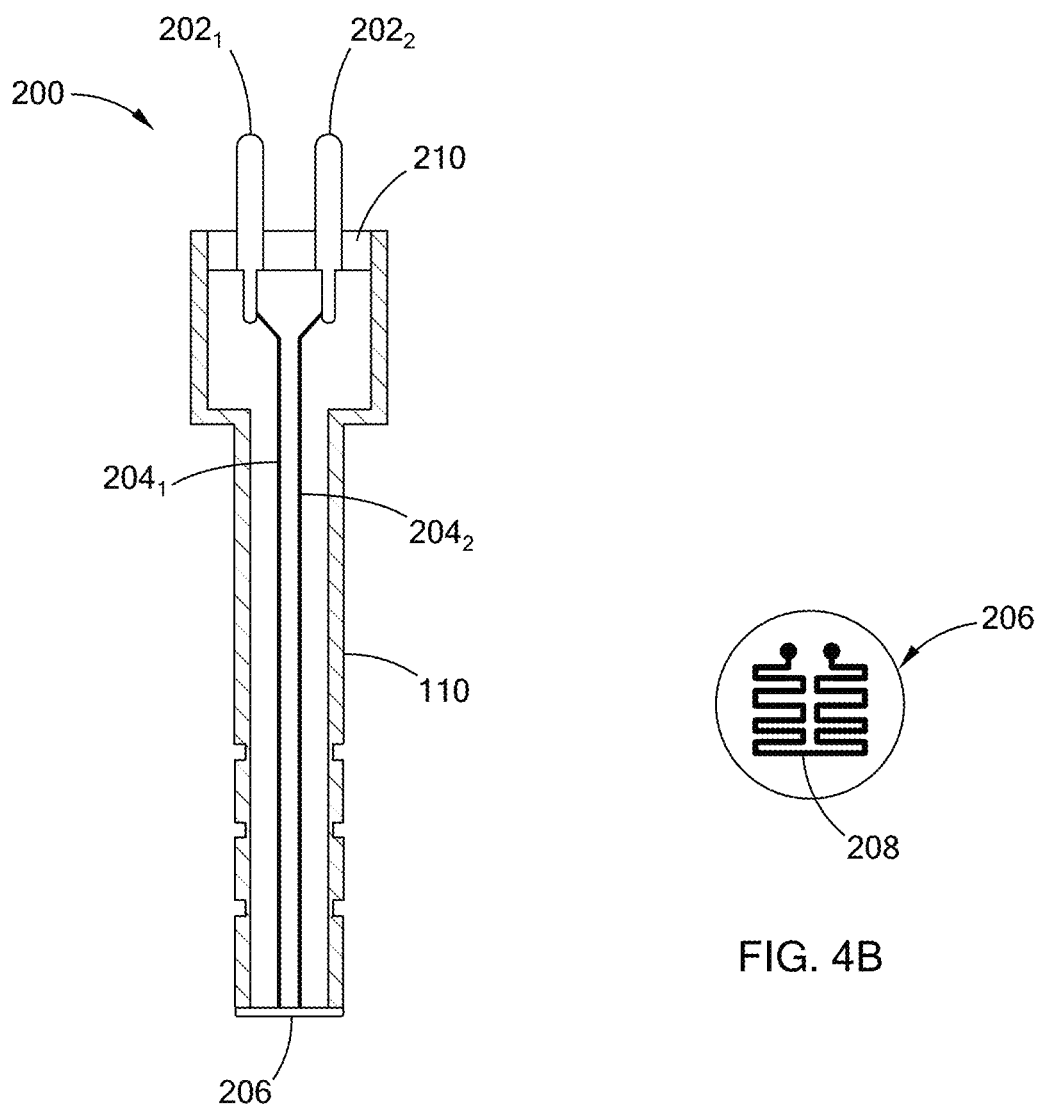
FIG. 4A is a cross-sectional view of a temperature detector probe in a second form in accordance with the teachings of the present disclosure.
FIG. 4B is a front view of the support cap and the sensor for the temperature detector probe of FIG. 4A.

FIGS. 4A and 4B illustrate another variation of a temperature detector probe that has different electrical connectors and sensor. Specifically, in one form, a temperature detector probe 200 includes the housing 110, a pair of electrical pins or leads 202 (i.e., $202_1$ and $202_2$), a pair of electrical connectors 204 (i.e., $204_1$ and $204_2$), a support cap 206, and a sensor 208. The electrical leads 202 are operable to electrically couple the probe 200 to the control system, and extend through the first end portion 120 of the housing 110. The probe 200 further includes a cap 210 disposed at the first end portion 120 to prevent foreign material from entering the housing 110.

The electrical connectors 204 are wires that are connected to the leads 202, for example, solder or spot welding, and may be referred to as wires 204. In one form, the electrical connectors 204 are small gauge wires, such as 36 to 40 gauge. Like the electrical connectors 112 of probe 100, the wires 204 extend through the bore 124 and are electrically coupled to the sensor 208 via the support cap 206.

In one form, the sensor 208 is a resistive element having a high TCR that is deposited on the support cap 206. That is, in lieu of mounting a case having the resistive material disposed therein, the probe 200 provides the resistive material directly on the support cap 206. Accordingly, when disposed in the object, the resistive material is directly in contact with or in close proximity to the surface of the object, and thus, may increase the response time of the sensor 208 and reduce thermal shunting.

In one form, the support cap 206 is a rigid disk of low thermal expansion material such as quartz, silicon, aluminum oxide (Al2O3), aluminum nitride (AlN). In another form, the support cap 206 is made of a metal substrate such as stainless steel or Invar coated with a dielectric to insulate the resistive element (i.e. sensor 208) from the substrate. Similar to the probe 100, a plated through hole may be formed in the support cap 206 to electrically couple the sensor 208 (i.e., resistive material) to the electrical connectors 204, and thus, to the control system. The support cap 206 could also be configured in a skeletonized structure to further reduce thermal loss between the sensor 208 and the support cap 206.

Referring to FIG. 5, the temperature detector probe 100, 200 may be provided with additional support for providing flexibility to the sensor and support cap. More particularly, a temperature detector probe 300 is configured in a similar manner as probe 200, but includes the sensor 116 and support cap 114 of probe 100. The probe 300 further includes a retainer ring 302 disposed at the second end portion 122 of the housing 110 and a temperature insulating material 304 (TIM) provided on the sensor 116. The retaining ring 302 secures the support cap 114 to the housing 110.

The TIM 304 is provided on the sensor 116, such that the TIM 304 is between the sensor 116 and the surface being measured. The thickness of the TIM 304 may be based on the application using the probe 300, and the structure of the support cap 114 and sensor 116. For example, with the support cap 114 being 10 to 50 microns thick, the TIM 304 may be 50 to 250 microns thick. In one form, the TIM 304 is a sheet material or molded in place material that is deposited to the exposed surface of the sensor 116. The TIM 304 is made from low hardness polymers or gels often silicone based and a combination of solid powder materials such as boron nitride, various metal oxides or metals to provide the thermal conductivity. The polymer is essentially a binder that holds this sophisticated combination of solids in usable form typically a sheet available in various thicknesses to fit the application or a dispensable liquid or paste form which may cure into a more stable soft solid material. Examples of TIM materials are Fujipoly, Sarcon, SPG20A, Sarcon GTR or Sarcon QR. The TIM 304 improves the thermal interface of the sensor 116 to the surface of the object to improve the accuracy of the temperature measurement.

Referring to FIG. 6, a temperature detector probe 400 provides another configuration for supporting and providing flexibility to the sensor. In one form, the probe 400 includes the wires (i.e., electrical connectors 204) and leads 202 of probe 200 to electrically couple the sensor 116 to the control system. Here, the probe 400 includes a support cap 402 provided at the second end portion 122 of the housing 110. In one form, the support cap 402 is made of elastomer, and may be configured in various suitable ways to support the sensor 116. For example, in one form, the support cap 402 includes a wall 404 that interfaces with an inner-wall of the housing 110, and defines a cavity 406 for housing the sensor 116 and access ports 408 (i.e., $408_1$ and $408_2$) for receiving the wires.

In one form, the temperature detector probe of the present disclosure may also include additional circuitry to process the signal from the sensor prior to providing the signal to the control system. For example, referring to FIG. 7, a probe 500 is configured in a similar manner as probe 200, 300, 400 and includes wires, as the electrical connectors, and leads 202. In one form, the probe 500 includes a signal processing circuit (SPC) 502 disposed in a chamber 504 defined within the housing 110. The SPC 702 is electrically coupled to the sensor (not shown) with a first set of wires 506 (i.e., $506_1$ and $506_2$), and to the leads 202 via a second set of wires 508 (i.e., $508_1$ and $508_2$). Accordingly, the wires 506 and 508 form electrical connectors that electrically couple the sensor 116 to the SPC 502, and the SPC 502 to the leads 202.

The SPC 502 may be configured in various suitable ways to condition the original signal from the sensor 116 prior to transmitting the signal to the control system. For example, in one form, the SPC 502 includes one or more electrical components to, for example, filter noise from the original signal, increase the strength of the signal, convert the signal to a particular to format utilized by the control system, convert the signal to a digital value, and/or perform a sensor offset correction. With the SPC 502, the probe 500 can be customized for a particular control system to provide an enhanced signal based on the original signal from the sensor. In addition, SPC 502 is thermally interfaced to the housing 110, and the housing 110 is thermally interfaced by direct contact such as an interference fit or through us of a TIM to the object 102. The temperature of the object 102 is actively controlled and therefore, maintains SPC 502 at temperatures compatible with SPC circuitry and materials. In other words, a thermal path provided between the SPC 502 and the object 102 controls the temperature of the SPC 502 at temperatures substantially the same as that of the object 102, which is controlled at temperatures compatible with electronic circuitry.

The various variations among the different probes may be interchangeable. For example, the probe 100 of FIG. 1 may include the leads 202 and the electrical connectors 204 in lieu of the electrical connectors 112. Conversely, the probes 200, 300, 400 and 500 may include the electrical connectors 112 of FIG. 1 in lieu of the leads 202 and the electrical connectors 204. I In yet another variation, each of the probes 100, 200, 300, 400 and 500 may be configured to hold an insulating gas. For example, with the grooves 120 separated from the bore 124 by a wall, the probe 400 may be filled with an insulating gas, such as Aragon, to further inhibit thermal conductivity between the housing 110 and the sensor 116.

The temperature detector probes of the present disclosure are configured to inhibit thermal conductivity between the sensor from the surrounding components, such as the housing, to improve the accuracy of the measured temperature of a surface. Additional improvements to the measurement are also provided by having the sensor interface directly with the surface being measured. The addition of a TIM to the sensor surface improves thermal interfacing and sensor repeatability with the surface being measured. The flexible support cap provides a constant force against the sensor, the TIM, and the surface being sensed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

Although the terms first, second, third, etc. may be used herein to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example embodiments. Furthermore, an element, component, region, layer or section may be termed a "second" element, component, region, layer or section, without the need for an element, component, region, layer or section termed a "first" element, component, region, layer or section.

What is claimed is:

1. A temperature detector probe comprising:
   a housing defining a bore extending longitudinally through the housing;
   a pair of electrical connectors extending longitudinally through the bore;
   a support cap disposed at a first end portion of the housing, wherein the support cap has a first surface that faces the bore and a second surface opposite of the first surface, the second surface being exposed to an environment, wherein the second surface is continuously even and forms a distal end of the support cap; and
   a sensor provided on the second surface of the support cap and electrically coupled to the pair of electrical connectors, wherein:
   the support cap is positioned between the pair of electrical connectors and the sensor,
   the housing includes one or more thermal breakers to reduce heat transfer between an object being measured and the temperature detector probe, the one or more thermal breakers are on an exterior of the housing with a continuous wall provided between the one or more thermal breakers and the bore, and
   the sensor forms a distal end of the temperature detector probe.

2. The temperature detector probe of claim 1, further comprising a pair of electrical pins extending through a second end portion of the housing and electrically coupled to the pair of electrical connectors.

3. The temperature detector probe of claim 1, wherein the pair of electrical connectors are POGO pins that are electrically coupled to the sensor via the support cap.

4. The temperature detector probe of claim 1, wherein the pair of electrical connectors are a pair of wires that are electrically coupled to the sensor via the support cap.

5. The temperature detector probe of claim 1, wherein the support cap is made of polyamide.

6. The temperature detector probe of claim 1, wherein the support cap includes two plated through-holes to electrically couple the pair of electrical connectors and the sensor.

7. The temperature detector probe of claim 1, wherein the sensor is a resistance temperature detector sensor chip.

8. The temperature detector probe of claim 1, further comprising a temperature insulating material disposed on a surface of the sensor.

9. The temperature detector probe of claim 1, wherein the sensor is configured to directly contact a surface of an object to measure a temperature of the object.

10. The temperature detector probe of claim 1, wherein the one or more thermal breakers includes one or more circumferential grooves defined along the exterior of the housing.

11. The temperature detector probe of claim 1, wherein the sensor is a thermocouple.

12. The temperature detector probe of claim 1, wherein the sensor is a thin film resistive element deposited on the support cap, and the thin film resistive element has a high temperature coefficient of resistance.

13. The temperature detector probe of claim 12, wherein the thin film resistive element is one of copper, nickel, nickel-iron, or platinum.

14. The temperature detector probe of claim 1, further comprising a signal processing circuit communicably coupled to the sensor to condition a signal from the sensor.

15. The temperature detector probe of claim 14, wherein
the housing defines a chamber at a second end portion of the housing, and the signal processing circuit is disposed at the chamber, and
the pair of electrical connectors are electrically coupled to the signal processing circuit to communicably couple the sensor and the signal processing circuit.

16. A system comprising:
an object; and
the temperature detector probe of claim 1, wherein the temperature detector probe is disposed in the object, and the sensor of the temperature detector probe directly faces a surface of the object.

17. A temperature detector probe comprising:
a housing defining a bore extending longitudinally through the housing, wherein the housing includes one or more thermal breakers to reduce heat transfer between an object being measured and the temperature detector probe, and the one or more thermal breakers include one or more circumferential grooves along an exterior of the housing with a continuous wall provided between the one or more thermal breakers and the bore;
a pair of electrical connectors extending longitudinally through the bore;
a support cap disposed at a first end portion of the housing, wherein the support cap has a first surface facing the bore and a second surface opposite of the first surface and exposed to an environment, wherein the second surface is continuously even and forms a distal end of the support cap; and
a sensor generating a signal indicative of a temperature and being electrically coupled to the pair of electrical connectors, wherein the sensor is disposed on the second surface of the support cap away from the bore and is exposed to the environment, wherein the sensor forms a distal end of the temperature detector probe.

18. The temperature detector probe of claim 17, wherein the support cap includes two plated through-holes to electrically couple the pair of electrical connectors and the sensor.

19. The temperature detector probe of claim 17, further comprising a pair of electrical pins extending through a second end portion of the housing, wherein the pair of electrical connectors are a pair of wires that are electrically coupled to the pair of electrical pins and to the sensor via the support cap.

20. The temperature detector probe of claim 19, further comprising a signal processing circuit, wherein:
the housing defines a chamber at an end opposite of the sensor, and the signal processing circuit is disposed at the chamber, and
the pair of electrical connectors are electrically coupled to the signal processing circuit to communicably couple the sensor and the signal processing circuit.

* * * * *